United States Patent
Chakraborty et al.

(10) Patent No.: US 10,588,102 B2
(45) Date of Patent: Mar. 10, 2020

(54) COORDINATED SYNCHRONIZATION CHANNEL TRANSMISSION AND RESTRICTED MEASUREMENT

(71) Applicant: QUALCOMM Incorporated, San Diego, CA (US)

(72) Inventors: Kaushik Chakraborty, San Diego, CA (US); Tao Luo, San Diego, CA (US); Xiaoxia Zhang, San Diego, CA (US); Sony Akkarakaran, Poway, CA (US); Makesh Pravin John Wilson, San Diego, CA (US); Sumeeth Nagaraja, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 15/670,911

(22) Filed: Aug. 7, 2017

(65) Prior Publication Data
US 2018/0213493 A1    Jul. 26, 2018

Related U.S. Application Data

(60) Provisional application No. 62/450,044, filed on Jan. 24, 2017.

(51) Int. Cl.
*H04W 56/00* (2009.01)
*H04L 1/16* (2006.01)
(Continued)

(52) U.S. Cl.
CPC ......... *H04W 56/001* (2013.01); *H04L 1/1692* (2013.01); *H04B 7/066* (2013.01);
(Continued)

(58) Field of Classification Search
CPC ... H04W 56/001; H04W 48/16; H04W 48/02; H04J 11/0053; H04L 5/0073
See application file for complete search history.

(56) References Cited

U.S. PATENT DOCUMENTS 8,937,937 B2   1/2015  Lindoff et al.
9,531,510 B2  12/2016  Kim et al.
(Continued)

OTHER PUBLICATIONS

Huawei., "WF on Periodicity for SS Burst Set", R1-1613273, 3GPP TSG RAN WG1 Meeting #87, Reno, USA, Agenda Item: 7.1.2.1, Nov. 14-18, 2016, pp. 1-4.

(Continued)

*Primary Examiner* — Khaled M Kassim
*Assistant Examiner* — Syed Ali
(74) *Attorney, Agent, or Firm* — Haynes and Boone, LLP

(57) ABSTRACT

Wireless communications systems and methods related to synchronization signal (SS) transmission coordination among base stations (BSs) and restricted SS measurements at user equipments (UEs) are provided. A first BS transmits a first SS burst in a first SS transmission period of a plurality of SS transmission periods. The first SS transmission period is designated to the first BS. A second SS transmission period of the plurality of SS transmission periods is designated to a second BS. The first SS transmission period and the second SS transmission period are different. The first BS receives, from a UE, a first signal in synchronization with the first SS burst. The first signal includes a SS measurement of the first SS burst.

25 Claims, 9 Drawing Sheets

(51) Int. Cl.
*H04B 7/26* (2006.01)
*H04B 7/212* (2006.01)
*H04B 7/06* (2006.01)
*H04W 88/16* (2009.01)

(52) U.S. Cl.
CPC ............ *H04B 7/212* (2013.01); *H04B 7/2628* (2013.01); *H04W 88/16* (2013.01)

(56) References Cited

U.S. PATENT DOCUMENTS

| | | | |
|---|---|---|---|
| 2007/0121484 | A1 | 5/2007 | Kim et al. |
| 2011/0116480 | A1* | 5/2011 | Li .......................... H04W 28/04 370/332 |
| 2015/0029877 | A1 | 1/2015 | Chen et al. |
| 2015/0222414 | A1* | 8/2015 | Tabet .................... H04L 7/0016 370/350 |
| 2016/0150431 | A1 | 5/2016 | Zhang et al. |
| 2016/0360452 | A1* | 12/2016 | Koorapaty ........... H04J 11/0069 |
| 2017/0093620 | A1* | 3/2017 | Um ...................... H04L 41/0803 |
| 2017/0181065 | A1* | 6/2017 | Svedman ................. H04J 11/00 |
| 2018/0110019 | A1* | 4/2018 | Ly ........................ H04W 56/001 |
| 2018/0234931 | A1* | 8/2018 | Ly ............................. H04L 5/005 |
| 2018/0279237 | A1* | 9/2018 | Kim ...................... H04L 27/2613 |
| 2018/0359788 | A1* | 12/2018 | Abedini ............. H04W 74/0875 |
| 2019/0200320 | A1* | 6/2019 | Selvaganapathy .... H04W 64/00 |
| 2019/0289639 | A1* | 9/2019 | Frenger ............. H04W 74/0833 |

OTHER PUBLICATIONS

Amin P., et al., "Bridging Interference Barriers in Self-Organized Synchronization", IEEE Sixth International Conference on Self-Adaptive and Self-Organizing Systems (SASO), 2012, IEEE, Sep. 10, 2012, pp. 109-118, XP032294968, DOI: 10.1109/SASO.2012.30, ISBN: 978-14673-3126-5.

Nokia., et al, "Downlink Discovery Signal for NR", 3GPP Draft; R4-168373, 3rd Generation Partnership Project (3GPP), Mobile Competence Centre; 650, Route Des Lucioles; F-06921 Sophia-Antipolis Cedex; France, vol. RAN WG4, Ljubljana, Slovenia; Oct. 19, 2016, XP051164421, 5 pages, Retrieved from the Internet: URL: http://www.3gpp.org/ftp/tsg_ran/WG4_Radio/TSGR4_77/Docs/ [retrieved on Oct. 19, 2016].

Partial International Search Report—PCT/US2017/068637—ISA/EPO—dated Apr. 11, 2018.

"3 Generation Partnership Project; Technical Specification Group Radio Access Network; Evolved Universal Terrestrial Radio Access (E-UTRA); TDD Home eNode B (HeNB) Radio Frequency (RF) requirements analysis (Release 13)", 3GPP Standard; Technical Report; 3GPP TR 36.922, 3RD Generation Partnership Project (3GPP), Mobile Competence Centre; 650, Route Des Lucioles; F-06921 Sophia-Antipolis Cedex; France, vol. RAN WG4, No. V13.0.0, Jan. 3, 2016 (Jan. 3, 2016), pp. 1-74, XP051294800, [retrieved on Jan. 3, 2016].

Nokia Alcatel-Lucent Shanghai Bell: "DL Signals for Mobility Measurements and mobility schemes in NR", 3GPP Draft; R1-1612811, 3RD Generation Partnership Project (3GPP), Mobile Competence Centre; 650, Route Des Lucioles; F-06921 Sophia-Antipolis Cedex; France, vol. RAN WG1, No. Reno, Nov. 14, 2016-Nov. 18, 2016, Nov. 13, 2016 (Nov. 13, 2016), XP051176753, 6 pages, Retrieved from the Internet: URL: http://www.3gpp.org/ftp/Meetings_3GPP_Sync/RAN1/Docs/ [retrieved on Nov. 13, 2016].

Nokia et al: "Mobility Measurements in Idle and Inactive Mode", 3GPP Draft; R2-1700113 Mobility Measurements in Idle and Inactive Mode, 3RD Generation Partnership Project (3GPP), Mobile Competence Centre; 650, Route Des Lucioles; F-06921 Sophia-Antipolis Cedex; vol. RAN WG2, No. Spokane, Jan. 17, 2017-20178119, Jan. 17, 2017 (Jan. 17, 2017), XP051210699, 5 pages, Retrieved from the Internet: URL:http://www.3gpp.org/ftp/Meetings_3GPP_Sync/RAN2/Docs/ [retrieved on Jan. 17, 2017].

Siemens: "Proposal for TR 25.838: Cell Sync Burst instructions (Rel. 4)", 3GPP Draft; R3-010108, 3RD Generation Partnership Project (3GPP), Mobile Competence Centre; 650, Route Des Lucioles; F-06921 Sophia-Antipolis Cedex; France, vol. RAN WG3, No. Sweden; Jan. 12, 2001, Jan. 12, 2001 (Jan. 12, 2001), XP050148905, 10 pages, [retrieved on Jan. 12, 2001].

International Search Report and Written Opinion—PCT/US2017/068637—ISA/EPO—dated Jul. 16, 2018.

* cited by examiner

COORDINATED SYNCHRONIZATION CHANNEL TRANSMISSION AND RESTRICTED MEASUREMENT

CROSS REFERENCE TO RELATED APPLICATIONS

The present application claims priority to and the benefit of the U.S. Provisional Patent Application No. 62/450,044, filed Jan. 24, 2017, which is hereby incorporated by reference in its entirety as if fully set forth below and for all applicable purposes.

TECHNICAL FIELD

This application relates to wireless communication systems, and more particularly to coordinating synchronization channel transmissions among base stations (BSs) and restricting synchronization channel measurements of user equipment devices (UEs). Certain embodiments enable and provide solutions and techniques for BSs to improve synchronization signal transmission performance.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

In a wireless network, BSs serving different cells may broadcast synchronization signals (SS) at certain time intervals to allow for UEs to synchronize and join the network. In certain scenarios, neighboring BSs simultaneously broadcast SSs at deterministic time periods. The simultaneous transmissions of the SSs from different BSs can cause inter-cell interference and affect synchronization performance and/or synchronization channel measurements at the UEs. Accordingly, improved procedures for managing inter-cell interference on synchronization channels are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for reducing inter-cell interference in synchronization channels. For example, BSs may coordinate with each other to determine an interference profile (e.g., interference among the BSs) and schedule synchronization signal transmissions (e.g., a SS burst transmission pattern) based on the interference profile. In addition, the BSs may request UEs to perform measurements on the synchronization channels based on the interference profile. Further, the BSs may filter synchronization channel measurement information based on the interference profile.

For example, in an aspect of the disclosure, a method of wireless communication, including transmitting, by a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and receiving, by the first BS from a user equipment (UE), a first signal in synchronization with the first SS burst, the first signal indicating a SS measurement of the first SS burst.

In an additional aspect of the disclosure, a method of wireless communication, including receiving, by a user equipment (UE) from a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and transmitting, by the UE to the first BS, a first signal based on at least a synchronization to the first SS burst the first signal indicating a SS measurement of the first SS burst.

In an additional aspect of the disclosure, an apparatus including a transmitter configured to transmit a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and a receiver configured to receive, from a user equipment (UE), a first signal in synchronization with the first SS burst, the first signal indicating a SS measurement of the first SS burst.

In an additional aspect of the disclosure, an apparatus including a receiver configured to receive, from a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and a transmitter configured to transmit, to the first BS, a first signal based on at least a synchronization to the first SS burst, the first signal indicating a SS measurement of the first SS burst.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, such embodiments can be implemented in various devices, systems, and methods.

DETAILED DESCRIPTION

Figure 1:
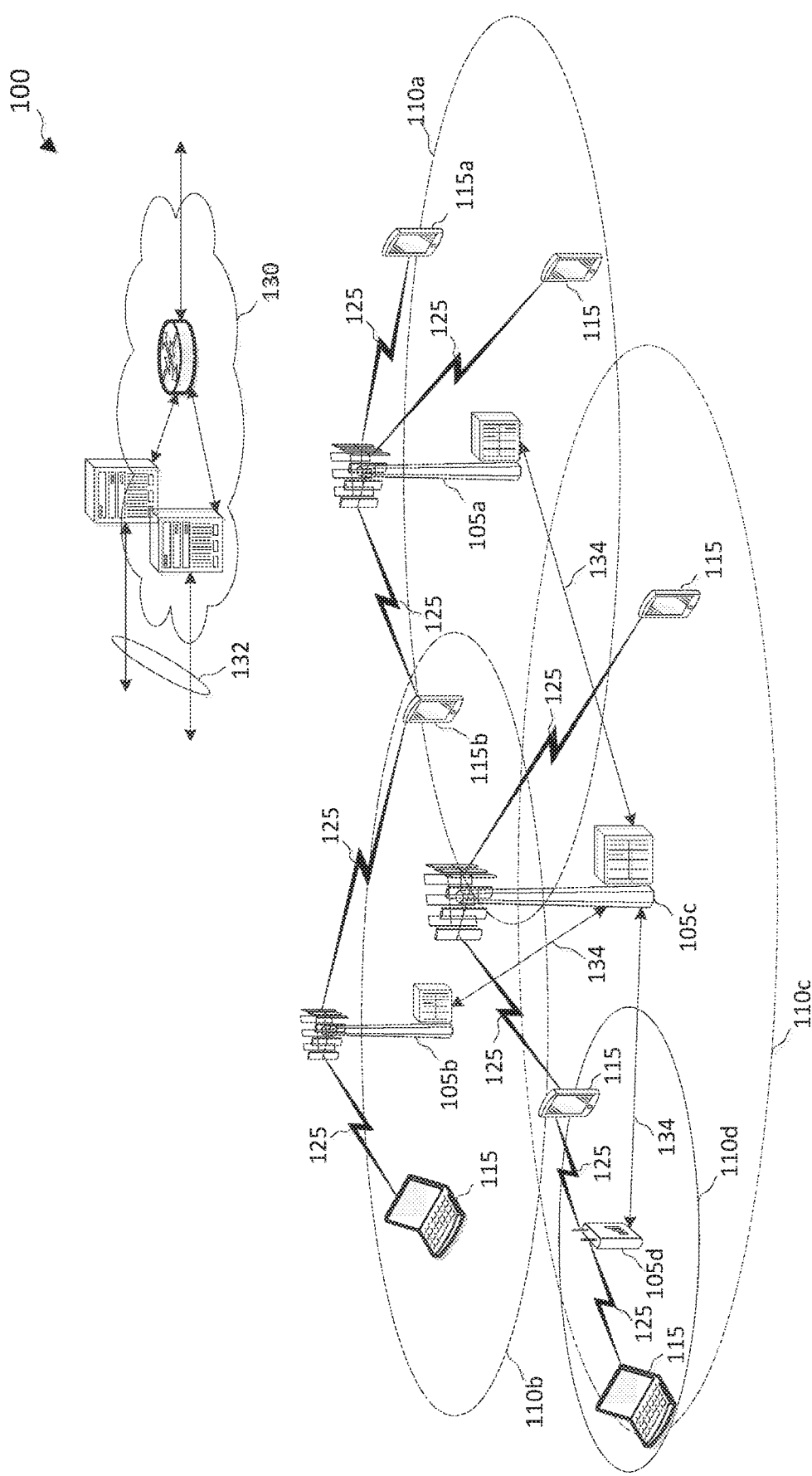
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in sub-6 GHz and mmWave bands) network.

The present disclosure describes coordinated SS transmission mechanisms for minimizing inter-cell interference on synchronization channels and restricted SS measurement mechanisms in a wireless network. A group of coordinating BSs may coordinate with each other to determine a SS burst transmission pattern for each BS. A group of neighboring BSs may coordinate such that inter-cell interference among the neighboring BSs on the synchronization channels may be minimal. SS transmission may be in the form of periodic SS burst sets. A SS burst set may include one or more SS bursts. A SS burst may include one or more SS blocks. A SS block may carry a combination of SSs. Some examples of SSs may include a primary synchronization signal (PSS), a secondary synchronization signal (SSS), a tertiary synchronization signal (TSS), an extended synchronization signal (ESS), a physical broadcast channel (PBCH) signal, and any suitable measurement reference signal (MRS). The coordinating BSs may coordinate with each other to determine a specific transmission pattern for each BS. For example, a transmission pattern may include certain SS blocks and/or certain SS bursts designated to a particular BS. In addition, the transmission pattern may designate a specific transmission spatial direction for a particular SS block and/or a particular SS burst. Further, a SS burst may include SS blocks in different frequency bands and different BSs may be assigned with SS blocks in different frequency bands. The SSs may facilitate UEs' synchronization in the network and/or provide the UEs with network configurations. A BS may request a UE in the serving cell to perform various restricted SS measurements and/or monitoring. For example, a restricted measurement and/or monitoring may be for a particular SS block transmitted by the serving BS. Alternatively, a restricted measurement and/or monitoring may be for a particular SS block transmitted by a neighboring BS.

Aspects of the present disclosure can provide several benefits. For example, by coordinating SS transmissions among BSs, a UE can receive SSs from a particular BS over a clean or unpolluted synchronization channel Clean or unpolluted refers to interference-free from other BSs' SS transmissions. Thus, the coordination can improve synchronization performance at the UEs. In addition, the coordination can improve SS measurement accuracies at the UEs since the UEs may receive SS bursts from one BS at a particular time. Further, the coordination allows the BSs to request the UEs to report SS measurements for a particular SS or from a particular neighboring BS, which may facilitate cell selection during handover and inter-cell interference management. As such, the disclosed embodiments can improve performance in a wireless network. The disclosed embodiments are compatible with any wireless communication protocol and may be suitable for use in any wireless networks, such 5G networks, sub-6 gigahertz (GHz) networks, and mmWave networks.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

The network 100 may operate over a sub-6 GHz range, a mmWav range, or any suitable frequency range. In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes an UL subframe in an UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data.

In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. AN UL-centric subframe may include a longer duration for UL communication than UL communication.

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. In some embodiments, the BS 105 may further transmit a TSS and/or an ESS to facilitate synchronization at the UE 115.

After receiving the PSS and SSS, the UE 115 may receive a master information block (MIB), which may be transmitted by the BS 105 in a PBCH. The MIB may contain system bandwidth information, a system frame number (SFN), and a Physical Hybrid-automatic request Indicator Channel (PHICH) configuration.

After decoding the MIB, the UE 115 may receive one or more system information blocks (SIBs), which may be transmitted by the BS 105 in the PBCH. For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the BSs 105 may coordinate the transmissions of SSs, such as the PSS, SSS, TSS, ESS, and PBCH signal, to minimize inter-cell interference on the SSs. For example, each BS 105 may be designated with specific SS transmission periods for SS transmissions. The SS transmission patterns of the BSs 105 may be determined such that SS transmissions of neighboring BSs 105 have a minimal interference or no interference to each other. The BSs 105 may restrict the SSs that the UEs 115 may monitor or measure. The BSs 105 may request SS measurement reports from the UEs 115. The BSs 105 may determine various operations, such as handover or inter-cell interference management, based on the received SS measurement reports. The SS transmission patterns and restricted SS measurements are described in greater detail herein.

Figure 2:
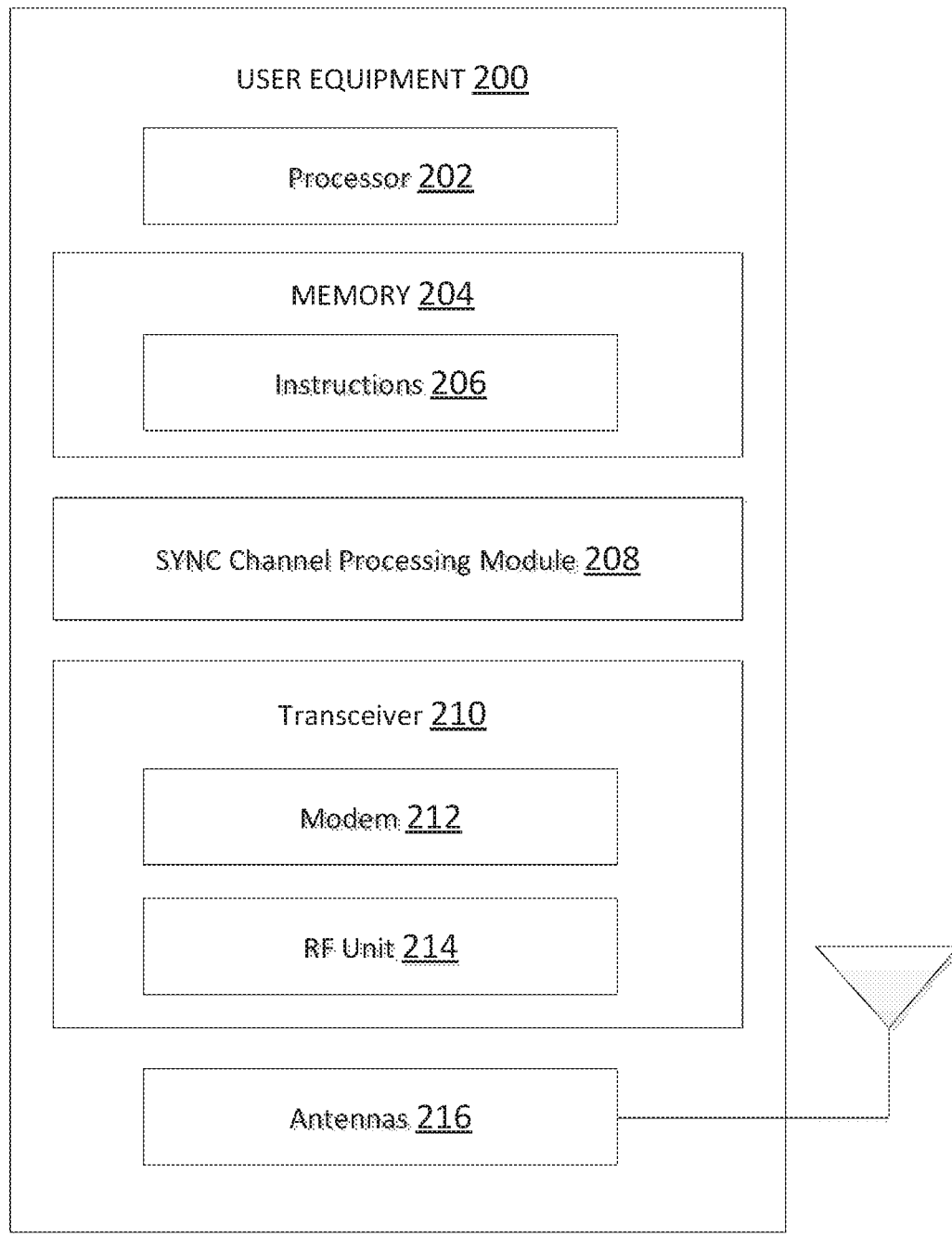
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, a synchronization (SYNC) channel processing module 208, a transceiver 210 including a modem subsystem 212 and a radio frequency (RF) unit 214, and an antenna 216. These elements may be in direct or indirect communication with each other, for example via one or more buses or other communication medium.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SYNC channel processing module 208 may be implemented via hardware, software, or combinations thereof. For example, SYNC channel processing module 208 may be implemented as a processor, circuit, and/or instructions 206 stored in the memory 204 and executed by the processor 202. The SYNC channel processing module 208 may be used for various aspects of the present disclosure. For example, the SYNC channel processing module 208 is configured to monitor for SSs, such as the PSS, SSS, TSS, ESS, and PBCH signals, synchronize to a network based on the SSs, perform for SS measurements based on instructions received from a BS such as the BS 105, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204 and/or the SYNC channel processing module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antenna 216 for transmission to one or more other devices. This may include, for example, transmission of association or RACH signals and SYNC channel measurements according to embodiments of the present disclosure. The antenna 216 may further receive data messages transmitted from other devices. This may include, for example, reception of SSs, such as PSSs, SSSs, TSSs, ESSs, PBCH signals, and/or SS measurement requests according to embodiments of the present disclosure. The antenna 216 may provide the received data messages for processing and/or demodulation at the transceiver 210. Although FIG. 2 illustrates antenna 216 as a single antenna, antenna 216 may include multiple antennas of similar or different designs in order to sustain multiple transmission links. The RF unit 214 may configure the antenna 216.

Figure 3:
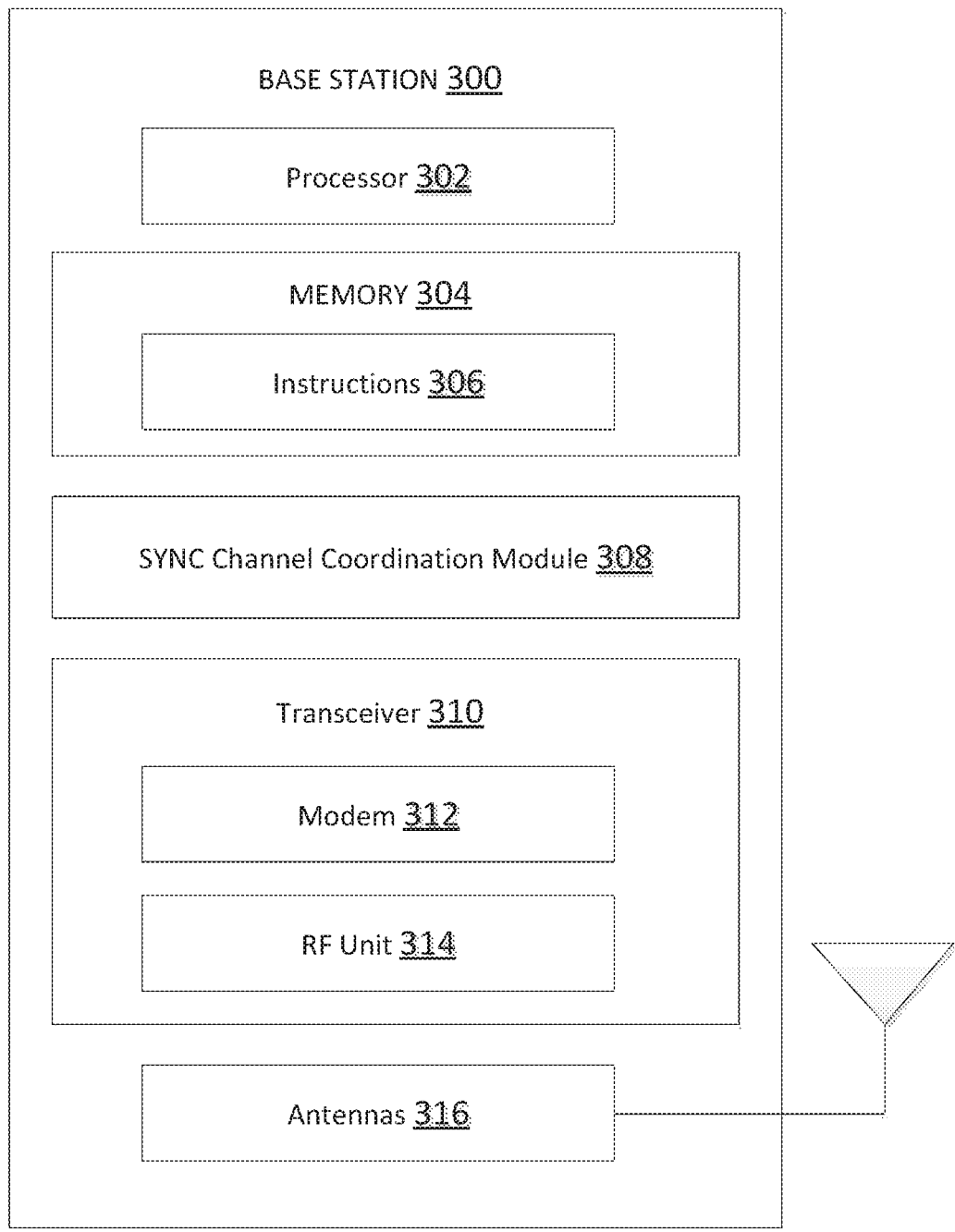
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, an SYNC channel coordination module 308, a transceiver 310 including a modem subsystem 312 and a RF unit 314, and an antenna 316. These elements may be in direct or indirect communication with each other, for example via one or more buses or other communication medium.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 3.

The SYNC channel processing module 308 may be implemented via hardware, software, or combinations thereof. For example, SYNC channel processing module 308 may be implemented as a processor, circuit, and/or instructions 306 stored in the memory 304 and executed by the processor 302. The SYNC channel coordination module 308 may be used for various aspects of the present disclosure. For example, the SYNC channel coordination module 308 is configured to coordinate SS transmissions with other BSs, for example, serving neighboring cells, to minimize inter-cell interference on SYNC channels, transmit SSs according to the coordination, request restricted SS measurements from serving UEs, determine various operations, such as handover and inter-cell interference management, based on the received SS measurements, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of information to complete attachment to a network and communication with a camped UE 115 according to embodiments of the present disclosure. The antenna 316 may further receive data messages transmitted from other devices and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
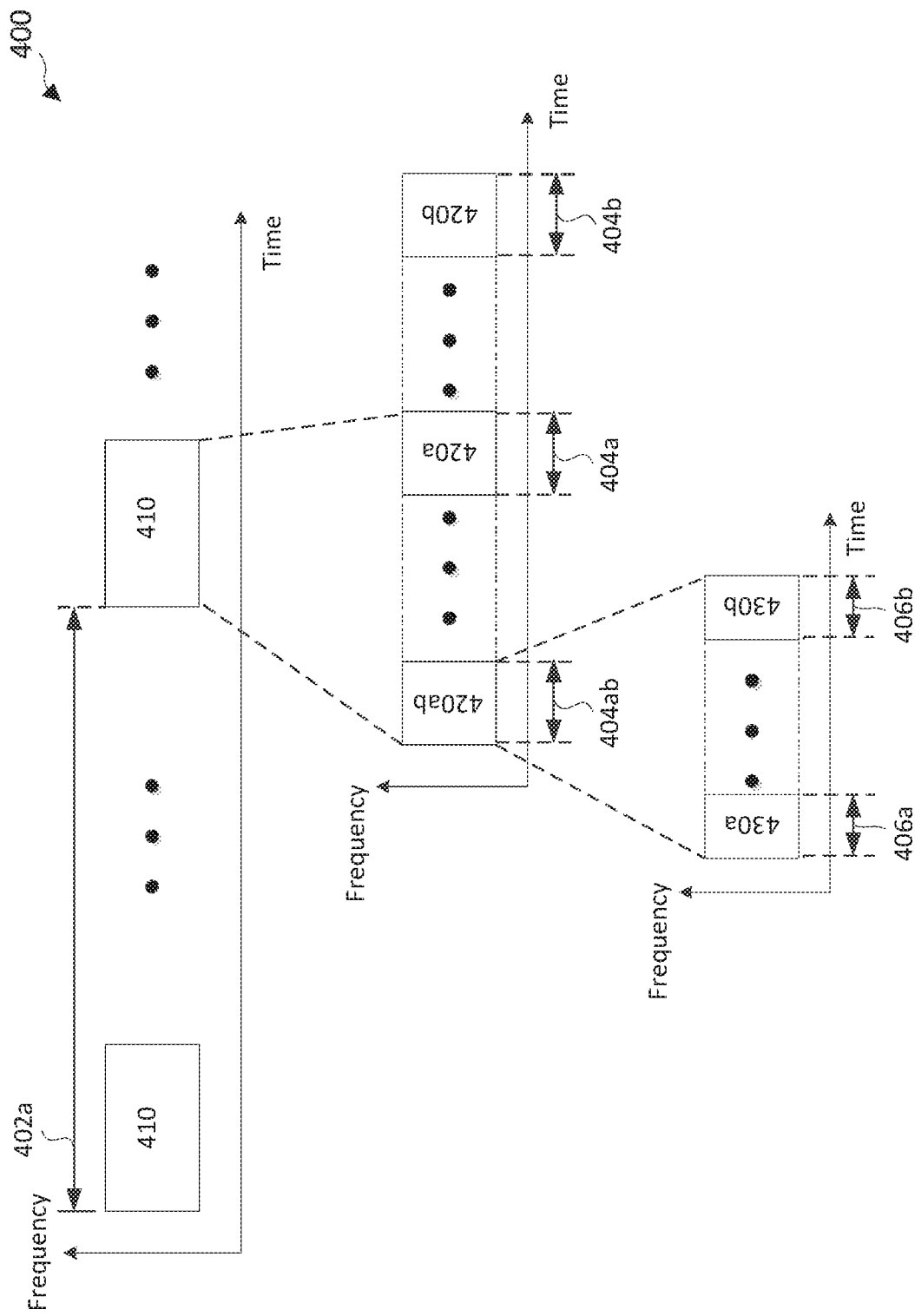
FIG. 4 illustrates a synchronization signal (SS) transmission scheme according to embodiments of the present disclosure.

FIG. 4 illustrates a SS transmission scheme 400 according to embodiments of the present disclosure. The scheme 400 can be employed by the BSs 105 and 300 to transmit SSs in the network 100. In FIG. 4, the x-axes represent time in some constant units, and the y-axes represent frequency in some constant units. The scheme 400 minimizes inter-cell interference on synchronization channels by coordinating SS transmissions among BSs of neighboring cells. The scheme 400 includes a plurality of SS burst sets 410. The SS burst sets 410 may be repeated at a periodicity 402. The periodicity 402 may be configured to any suitable time intervals that may facilitate synchronization in the network. In some embodiments, the periodicity 402 may be about 5 milliseconds (ms), about 10 ms, or about 20 ms. Each SS burst set 410 may include one or more SS bursts 420, for example, in consecutive time periods. Each SS burst 420 may include one or more SS blocks 430, for example, in consecutive time periods. Each SS burst 420 may span a period 404. Each SS block 430 may span a duration 406 of one or more OFDM symbols. The SS blocks 430 may carry any combination of SSs, which may include a PSS, an SSS, a TSS, an ESS, a PBCH signal, and/or any MRS, in a SS block 430. Accordingly, in some instances, a UE (e.g., the UEs 115 and 200) may identify at least on OFDM symbol index, slot index in a radio frame and a radio frame number of a SS block 430. In some embodiments, an SS burst set 410 may include about four consecutive SS bursts 420 and each SS burst 420 may include about two SS blocks 430.

Accordingly, in some instances, one or more multiple SS blocks 430 may compose an SS burst 420. One or more multiple SS bursts 420 may further compose an SS burst set 410, where the number of SS bursts 420 within a SS burst set 410 may be finite. In some instances, at least one periodicity of SS burst set 410 may be supported in a network. In some instances, a given SS block 430 is repeated with a SS burst set periodicity. In some instances, the maximum number of SS blocks 430 within a SS burst set 410 may be dependent on a carrier frequency used by a network.

In the scheme 400, BSs coordinates with each other to schedule SS transmission in a specific pattern so that interference on SSs across the BSs is minimal. The scheme 400 allows distribution or assignment of SS bursts 420 and/or SS blocks 430 across different BSs, for example, via time-division multiplexing (TDM). As an example, a BS A and a BS B are in coordination to determine a SS transmission schedule. The BSs A and B may be similar to the BSs 105. For example, in the SS transmission schedule, the BS A is scheduled to transmit one or more SSs in the SS burst 420a and in the SS block 430a of the SS burst 420ab. The BS B is scheduled to transmit one or more SSs in the SS burst 420b and in SS block 430b of the SS burst 420ab. Thus, the durations 404a and 406a are designated SS transmission time periods for the BS A. The durations 404b and 406b are designated SS transmission time periods for the BS B. The specific SS transmission pattern for the BS A and the BS B may be the same or different across different SS burst set 410.

Figure 5:
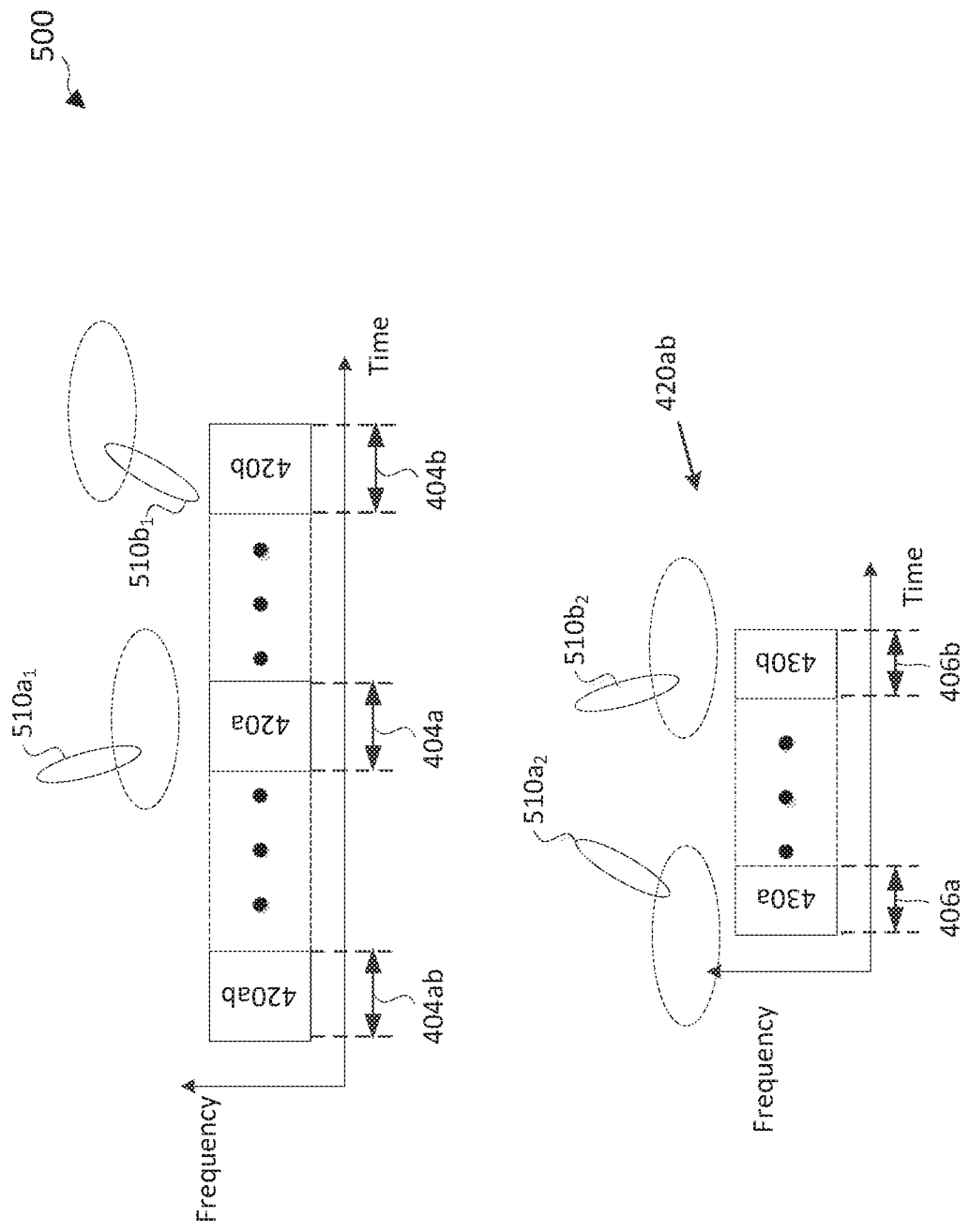
FIG. 5 illustrates a synchronization SS transmission scheme with selective spatial directions according to embodiments of the present disclosure.

FIG. 5 illustrates a SS transmission scheme 500 with selective spatial directions according to embodiments of the present disclosure. The scheme 500 can be employed by the BSs 105 and 300 to transmit SS bursts (e.g., the SS bursts 420) in the network 100. In FIG. 5, the x-axes represent time in some constant units, and the y-axes represent frequency in some constant units. The scheme 500 is similar to the scheme 400, but additionally includes transmission spatial directions in the SS burst transmission patterns. For example, certain wireless systems, such as a mmWav system, may have a high path loss (PL). To overcome the higher PL, BSs may perform hybrid beamforming, including analog beamforming and digital beamforming, to create narrow beam patterns for transmissions to UEs (e.g., the UEs 115). In the scheme 500, the BSs account for transmission beam or spatial directions when coordinating SS burst transmissions.

As an example, the BS A transmits the SS burst 420a in a spatial direction $510a_1$ during the period 404a and the SS block 430a in a spatial direction $510a_2$ during the 406a. The BS B transmits the SS burst 420b in a spatial direction $510b_1$ during the period 404b and the SS block 430b in a spatial direction $510b_2$ during the duration 406b. The BS A may sweep through all spatial directions 510a supported by the BS A over a certain time period. For example, when the BS A implements 3 beam directions, the spatial directions 510a may be spaced apart by 120 degrees. Similarly, the BS B may sweep through all spatial directions 510b implemented by the BS B over a certain time period. The BS A and the BS B may coordinate to determine the transmission periods 404 and the spatial directions 510 such that interference between the BS A and the BS B is minimal.

Figure 6:
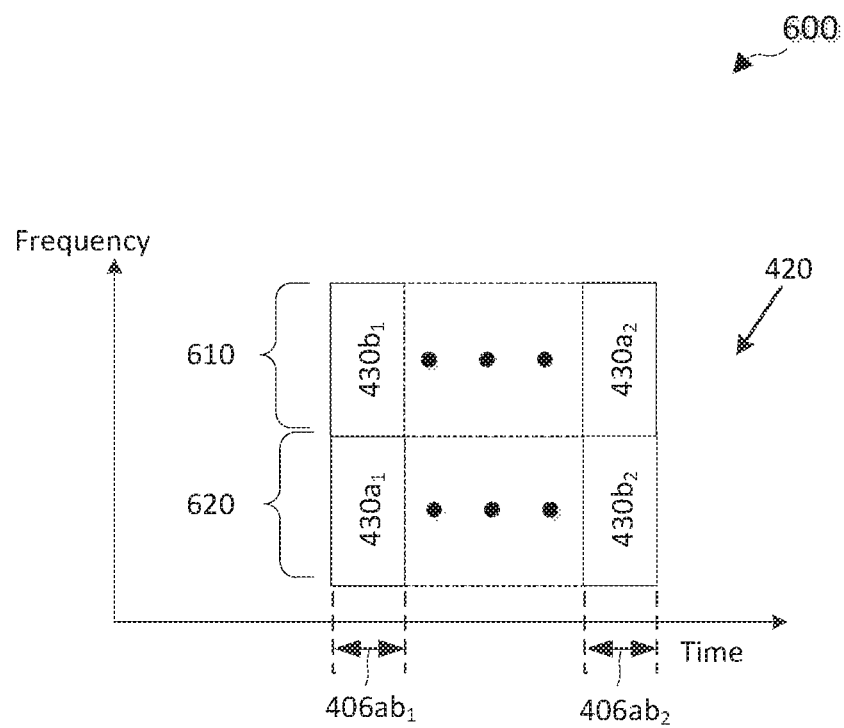
FIG. 6 illustrates a synchronization SS transmission scheme with frequency-division multiplexing (FDM) according to embodiments of the present disclosure.

FIG. 6 illustrates a SS transmission scheme 600 with FDM according to embodiments of the present disclosure. The scheme 600 can be employed by the BSs 105 and 300 to transmit SS bursts (e.g., the SS bursts 420) in the network 100. In FIG. 6, the x-axes represent time in some constant units, and the y-axes represent frequency in some constant units. The scheme 600 is similar to the scheme 400, but additionally applies FDM to SS transmissions. The scheme 600 may be employed in conjunction with the schemes 400 and 500. In the scheme 600, a SS burst 420 can span frequency bands 610 and 620. As shown, the BS A is scheduled to transmit a SS block $430a_1$ over the frequency band 620 during the duration $406ab_1$ and a SS block $430a_2$ over the frequency band 610 during the duration $406ab_2$. The BS B is scheduled to transmit a SS block $430b_1$ over the frequency band 610 during the duration $406ab_1$ and a SS block $430a_2$ over the frequency band 620 during the duration $406ab_2$.

In an embodiment, when a network employs a SYNC raster and the SS bandwidth is significantly less than the system bandwidth, the scheme 600 may be applied to allow BSs of neighboring cells to transmit SS in different portions of the system bandwidth. While the scheme 600 is illustrated with two contiguous frequency bands 610 and 620, the scheme 600 may use any suitable number of contiguous and/or non-contiguous frequency bands for FDM SS transmissions. In an embodiment, the scheme 600 may use two contiguous frequency bands to reduce synchronization complexity at UEs (e.g., the UEs 115). When the SS frequency bands occupy a portion of the system bandwidth and remaining system bandwidth is unused, the BSs can transmit SSs at a high power level to improve synchronization coverage. When the remaining system bandwidth is used by other channels (e.g., MRS and/or data) that are not always present, the SS transmission may use the remaining system bandwidth when the other channels are not present. In some embodiments, the scheme 600 may assign different time locations for SS blocks 430 in different frequency bands (e.g., the frequency bands 610 and 620).

Figure 7:
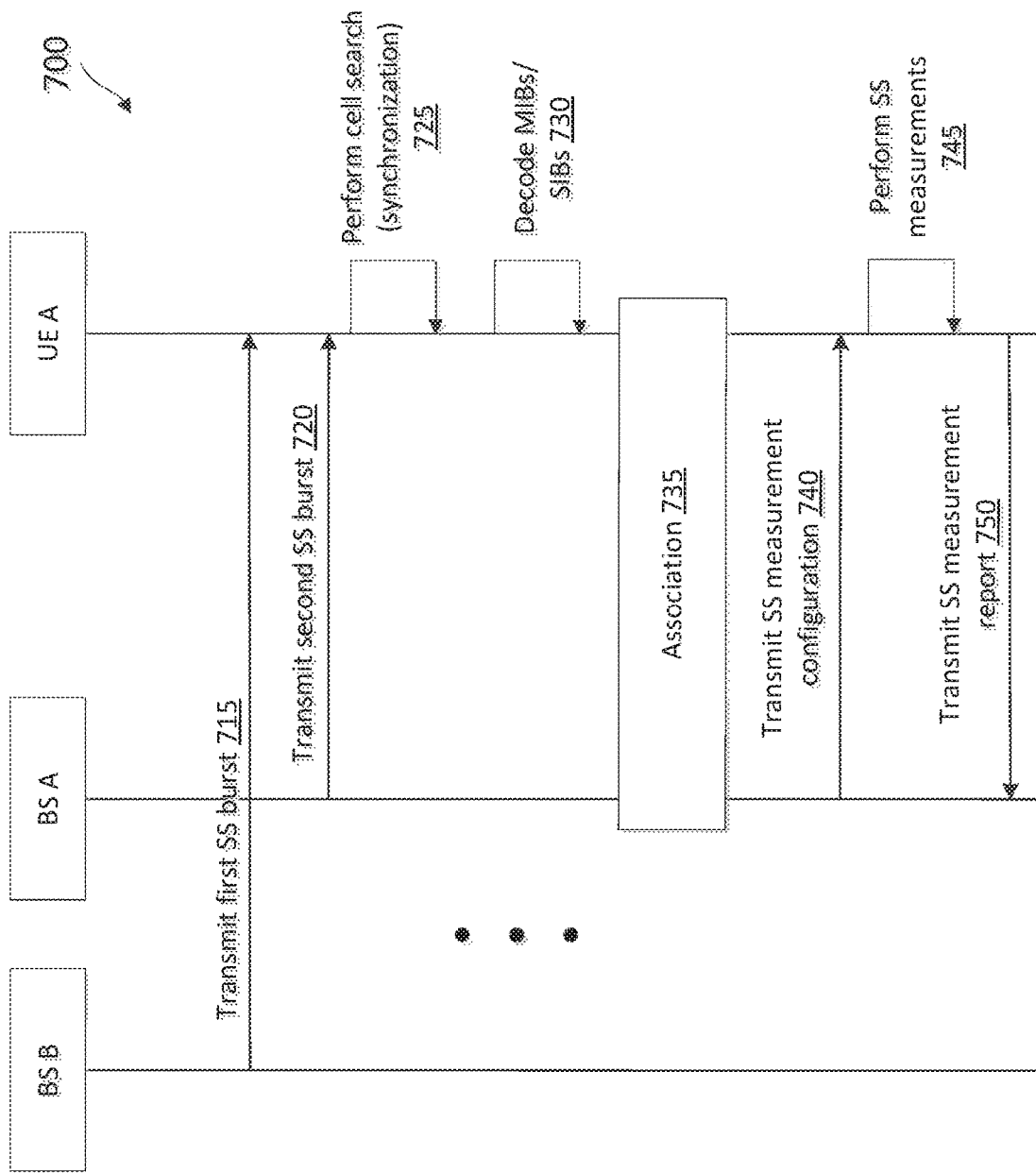
FIG. 7 illustrates a signaling diagram of a method of SS transmissions and SS measurements according to embodiments of the present disclosure.

FIG. 7 illustrates a signaling diagram of a method 700 of SS transmissions and SS measurements according to embodiments of the present disclosure. The method 700 is implemented between a BS A, a BS B, a BS C, and a UE A. The BS A, BS B, and BS C are similar to the BSs 105 and 300. The UE A is similar to the UEs 115 and 200. Steps of the method 700 can be executed by computing devices (e.g., a processor, processing circuit, and/or other suitable component) of the BS A and BS B and the UE A. The method 700 may employ similar mechanisms as in the schemes 400, 500, and 600 described with respect to FIGS. 4, 6, and 6, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 715, the BS B transmits a first SS burst (e.g., the SS bursts 420b) in a time period (e.g., the periods 404b) designated to the BS B. At step 720, the BS A transmits a second SS burst (e.g., the SS bursts 420a) in a time period (e.g., the periods 404a) designated to the BS A. The transmissions of the first SS burst and the second SS burst may be in a broadcast mode. The transmissions of the first SS burst and the second SS burst, and the third SS burst are coordinated between the BS A and the BS B. For example, the BS A and the BS B are neighboring BSs serving neighboring cells. The BS A and BS B may repeat the transmissions of the first SS burst and the second SS burst based on predetermined periodicities (e.g., the periodicities 402) that can facilitate synchronizations in the network. In an embodiment, the first SS burst and the second SS burst may be transmitted in certain spatial directions (e.g., the spatial direction 510) and/or in certain frequency bands (e.g., the frequency bands 610 and 620) agreed among the BSs A, B, and C for inter-cell interference mitigation.

At step 725, the UE A performs a cell search in the network. The UE A may listen for SS bursts carrying SSs, such as PSSs, SSSs, TSSs, ESSs, and/or PBCH signals. For example, the UE A may determine that the third SS burst has a strongest receive power or a best receive signal quality among the first, second, and third SS bursts based on the listening. Thus, the UE A may perform synchronization (e.g., timing-synchronization) based on the third SS burst (e.g., the PSS, SSS, TSS, and/or ESS). In some embodiments, the BS A may transmit the PSS, SSS, TSS, and/or ESS in separate SS bursts. In such embodiments, the UE A may wait to receive the separate SS bursts before completing synchronization.

At step 730, the UE A decodes MIBs and/or SIBs from the second SS burst. For example, the second SS burst may include a PBCH signal carrying MIBs and/or SIBs. The MIBs and/or SIBs may carry a configuration indicating a SS burst transmission pattern (e.g., periods 404a and periodicities 402) of the BS A. In some embodiments, the BS A may transmit the PBCH signal in another SS burst. Thus, the UE A may wait to receive the another SS burst before decoding the MIBs and/or SIBs.

At step 735, after completing synchronization and obtaining MIBs and/or SIBs, the UE A performs association with the BS A. For example, the association may include a RACH procedure and a connection establishment procedure.

At step 740, after the association, the BS A transmits a SS measurement configuration to the UE. For example, the BS A may request a restricted SS measurement, for example, measurement of one or more particular SS blocks (e.g., the SS blocks 430), from the UE. Accordingly, in some instances, the BS A may provide information for the UE to derive measurement timing and/or duration in the SS measurement configuration. In an embodiment, the BS A may indicate the SS blocks for measurement by employing a bitmask. For example, a SS burst may include 4 SS blocks. The locations of the 4 SS blocks may be represented by a 4-bit bitmask (e.g., b0, b1, b2, b3). The BS A may set a bit value (e.g., a value of 1) at a particular bit location corresponding to the SS block for the measurement request.

At step 745, the UE A perform SS measurements based on the received SS measurement configuration. At step 750, the UE A transmits a SS measurement report to the BS A based on the SS measurements.

In an embodiment, the one or more particular SS blocks may be within a SS burst transmitted by the serving BS A. In another embodiment, the one or more particular SS blocks may be within a SS burst transmitted by a BS (e.g., the BS B) serving a neighboring cell. The BS A may perform inter-cell interference management and/or synchronization coordination with the BS B based on measurement reports of the serving cell and neighboring cells received from the UE A. In addition, the BS A may select a neighboring cell for the UE A during a handover based on the measurement reports of the neighboring cells. The BS A may restrict SS measurements at the UE A based on a certain level of interference among the BS A, BS B, and BS C. Accordingly, in some instances, the BS A may filter SS measurement information in SS measurements received from different UEs based on inter-cell interference and may coordinate with the BS B to determine and/or update scheduling of synchronization signal transmission. In some embodiments, the BS A may request the UE A to monitor one or more particular SS blocks of the BS A for identifying a radio link failure between the UE A and the BS A.

In some embodiments, the UE A may store a history of SS measurements (e.g., in the memory 204). In such embodiments, after a disconnection from the BS A, the UE A may reselect the BS A as a serving BS based on the history of measurements. While the method 700 is illustrated with two BSs and in the context of SS bursts, the method 700 can be applied to any suitable number of BSs in coordination for synchronization and may the scheduling may be in units of SS blocks (e.g., the SS blocks 430) within SS bursts.

Figure 8:
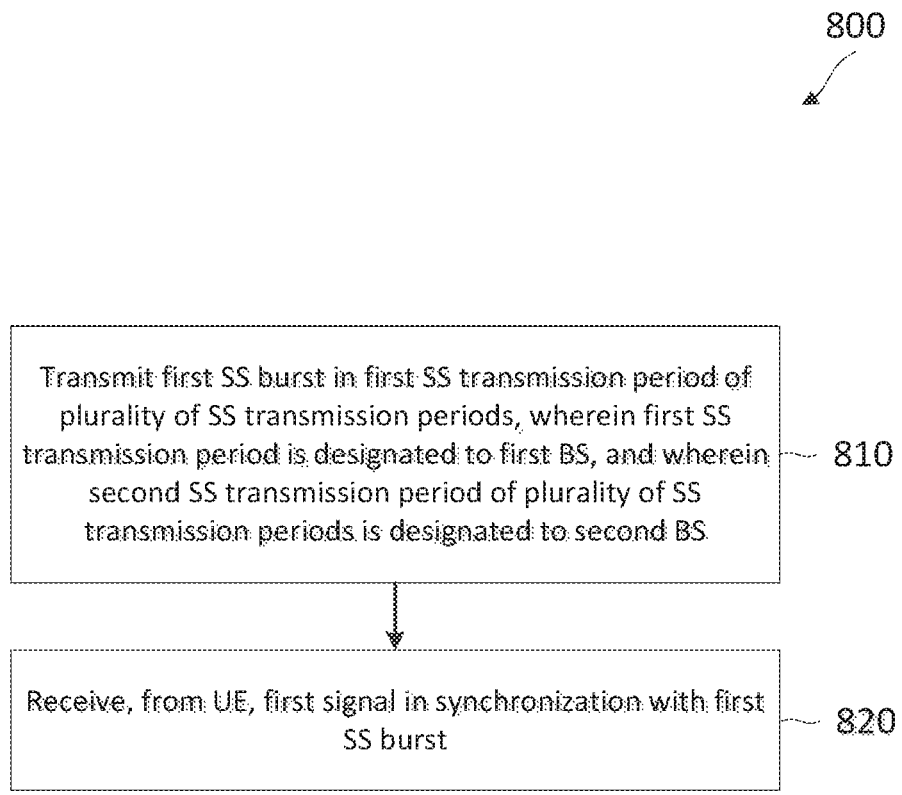
FIG. 8 is a flow diagram of a coordinated SS transmission method according to embodiments of the present disclosure.

FIG. 8 is a flow diagram of a coordinated SS transmission method 800 according to embodiments of the present disclosure. Steps of the method 800 can be executed by a computing device (e.g., a processor, processing circuit, and/or other suitable component) of a wireless communication device, such as the BSs 105 and 300. The method 800 may employ similar mechanisms as in the schemes 400, 500, and 600 and the method 700 described with respect to FIGS. 4, 5, 6, and 7, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes transmitting, by a first BS (e.g., the BS A), a first SS burst in a first SS transmission period of a plurality of SS transmission periods (e.g., the periods 404). The first SS transmission period (e.g., the periods 404a) is designated to the first BS. A second SS transmission period (e.g., the periods 404b) of the plurality of SS transmission periods is designated to a second BS (e.g., the BS B).

At step 820, the method 800 includes receiving, by the first BS from a UE (e.g., the UEs 115 and 200 and the UE A), a first signal in synchronization with the first SS burst. The first signal may be any signal transmitted by the UE after the UE has completed synchronization. In an embodiment, the UE may request an association with the first BS after synchronizing to the first BS. During and/or after the association, the first BS may request the UE to perform SS measurement on a specific SS block (e.g., the SS blocks 430) as shown in the method 700. In such an embodiment, the first signal may be a response to the request. For example, the first signal may carry a measurement of the requested SS block.

Figure 9:
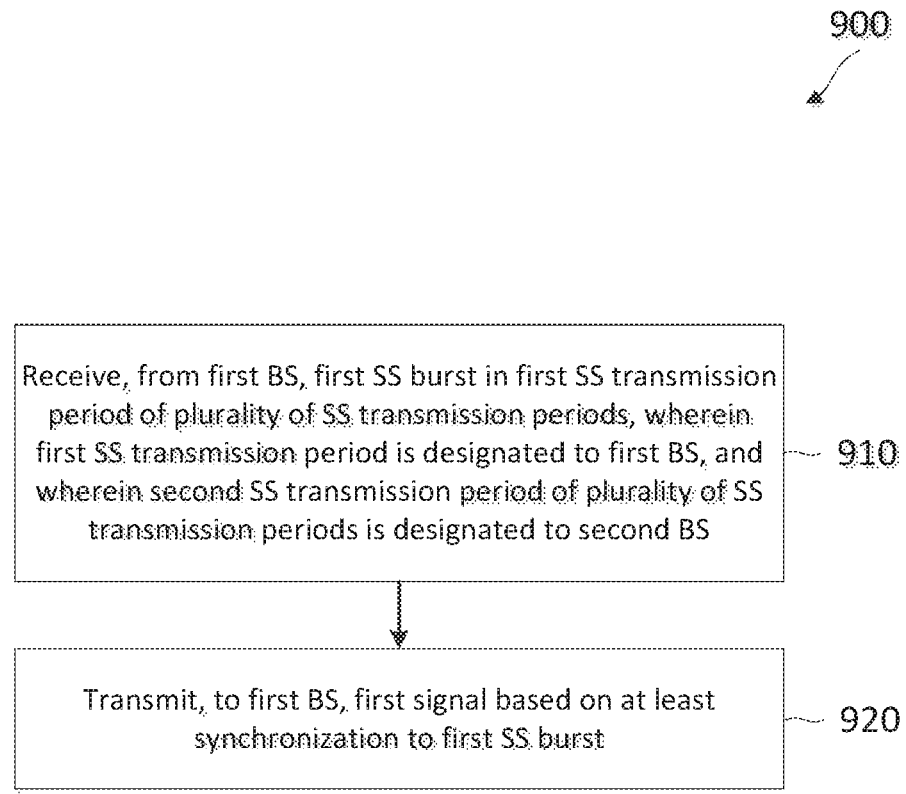
FIG. 9 is a flow diagram of a SS processing method according to embodiments of the present disclosure.

FIG. 9 is a flow diagram of a SS processing method 900 according to embodiments of the present disclosure. Steps of the method 900 can be executed by a computing device (e.g., a processor, processing circuit, and/or other suitable component) of a wireless communication device, such as the UEs 115 and 200. The method 900 may employ similar mechanisms as in the schemes 400, 500, and 600 and the method 700 described with respect to FIGS. 4, 5, 6, and 7, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving, by the UE (e.g., the UE A) from a first BS (e.g., the BS A), a first SS burst in a first SS transmission period of a plurality of SS transmission periods (e.g., the periods 404). The first SS transmission period (e.g., the periods 404a) is designated to the first BS. A second SS transmission period (e.g., the periods 404*b*) of the plurality of SS transmission periods is designated to a second BS (e.g., the BS B).

At step 920, the method 900 includes transmitting, by the UE to the first BS, a first signal in synchronization with the first SS burst. For example, the UE may perform synchronization based on the received first SS burst. The first signal may be any signal transmitted by the UE after the UE has completed synchronization to the first BS. In an embodiment, the UE may request for an association with the first BS after the synchronization. During or after the association, the first BS may request the UE to perform SS measurement on a specific SS block (e.g., the SS blocks 430) as shown in the method 700. In such an embodiment, the first signal may be a response to the request. For example, the first signal may carry a measurement of the requested SS block.

In an embodiment, NR synchronization signal is based on cyclic prefix-orthogonal frequency division multiplexing (CP-OFDM). NR defines at least two types of synchronization signals; new radio-primary synchronization signal (NR-PSS) and new radio-secondary synchronization signal (NR-SSS). NR-PSS is defined at least for initial symbol boundary synchronization to the NR cell. NR-SSS is defined for detection of NR cell identifier (ID) or at least part of NR cell ID. The number of NR cell IDs is targeted to be approximately 1000. NR-SSS detection is based on the fixed time/frequency relationship with NR-PSS resource position irrespective of duplex mode and beam operation type at least within a given frequency range and cyclic prefix (CP) overhead. At least, normal CP is supported for NR-PSS/SSS.

The raster for NR synchronization signals can be different per frequency range. At least for frequency ranges where NR supports a wider carrier bandwidth and operation in a wider frequency spectrum (e.g. above 6 GHz), the NR synchronization signals raster can be larger than the 100 kilohertz (kHz) raster of LTE. When the synchronization signal bandwidth is the same as the minimum system bandwidth for a given frequency band which UE searches, synchronization signal frequency raster is the same as the channel raster. For carrier supporting initial access, for frequency range up to 6 GHz, minimum carrier bandwidth for NR can be either 5 or 10 megahertz (MHz) and is frequency band dependent. For frequency range from 6 GHz to 52.6 GHz, minimum carrier bandwidth for NR can be either 40 or 80 MHz and is frequency band dependent.

At least one broadcast channel (e.g., new radio-physical broadcast channel (NR-PBCH)) is defined. NR-PBCH decoding is based on the fixed relationship with NR-PSS and/or NR-SSS resource position irrespective of duplex mode and beam operation type at least within a given frequency range and CP overhead. NR-PBCH is a non-scheduled broadcast channel carrying at least a part of minimum system information with fixed payload size and periodicity predefined in the specification depending on carrier frequency range.

In both single beam and multi-beam scenario, time division multiplexing of NR-PSS, NR-SSS, and NR-PBCH is supported. NR-PSS, NR-SSS and/or NR-PBCH can be transmitted within an SS block. For a given frequency band, an SS block corresponds to N 01-DM symbols based on the default subcarrier spacing, and N is a constant. The signal multiplexing structure is fixed in a specification. UE shall be able to identify at least OFDM symbol index, slot index in a radio frame and radio frame number from an SS block.

One or multiple SS block(s) compose an SS burst. One or multiple SS burst(s) further compose an SS burst set where the number of SS bursts within a SS burst set is finite. From physical layer specification perspective, at least one periodicity of SS burst set is supported. From UE perspective, SS burst set transmission is periodic and UE may assume that a given SS block is repeated with a SS burst set periodicity. Note that NR-PBCH contents in a given repeated SS block may change. A single set of possible SS block time locations is specified per frequency band. The maximum number of SS-blocks within SS burst set may be carrier frequency dependent. The position(s) of actual transmitted SS-blocks can be informed for helping CONNECTED/IDLE mode measurement, for helping CONNECTED mode UE to receive DL data/control in unused SS-blocks and potentially for helping IDLE mode UE to receive DL data/control in unused SS-blocks. By default, the UE may neither assume the gNB transmits the same number of physical beam(s), nor the same physical beam(s) across different SS-blocks within an SS burst set. For initial cell selection, UE may assume default SS burst set periodicity which may be frequency band-dependent. At least for multi-beams case, at least the time index of SS-block is indicated to the UE.

For CONNECTED and IDLE mode UEs, NR supports network indication of SS burst set periodicity and information to derive measurement timing/duration (e.g., time window for NR-SS detection). The network provides one SS burst set periodicity information per frequency carrier to UE and information to derive measurement timing/duration if possible. In case that one SS burst set periodicity and one information regarding timing/duration are indicated, UE assumes the periodicity and timing/duration for all cells on the same carrier. If the network does not provide indication of SS burst set periodicity and information to derive measurement timing/duration the UE should assume 5 ms as the SS burst set periodicity. NR supports set of SS burst set periodicity values for adaptation and network indication.

For initial access, UE can assume a signal corresponding to a specific subcarrier spacing of NR-PSS/SSS in a given frequency band given by specification. For NR-PSS, Zadoff Chu (ZC)-sequence can be used as the baseline sequence for NR-PSS for study. At least one basic sequence length is defined for each synchronization signal in case of sequence-based synchronization signal design. The number of antenna port of NR-PSS is 1.

For NR-PBCH transmission, a single fixed number of antenna port(s) is supported. No blind detection of NR-PBCH transmission scheme or number of antenna ports is required by the UE. UE assumes the same PBCH numerology as that of NR-SS. For the minimum system information delivery, part of minimum system information is transmitted in NR-PBCH. NR-PBCH contents shall include at least part of the system frame number (SFN), and cyclic redundancy check (CRC). The remaining minimum system information is transmitted in shared downlink channel via new radio-physical downlink shared channel (NR-PDSCH).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising transmitting, by a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and receiving, by the first BS from a user equipment (UE), a first signal in synchronization with the first SS burst.

The method further includes wherein the first SS burst includes at least one of a primary synchronization signal (PSS), a secondary synchronization signal (SSS), an extended synchronization signal (ESS), a third synchronization signal (TSS), or a physical broadcast channel (PBCH) signal. The method further includes transmitting, by the first BS, a second SS burst in a third SS transmission period of the plurality of SS transmission periods, wherein the third SS transmission period is adjacent to the first SS transmission period. The method further includes transmitting, by the first BS, a second SS burst in a third SS transmission period of the plurality of SS transmission periods based on a predetermine periodicity. The method further includes obtaining, by the first BS, a SS burst transmission pattern designated to the first BS based on an interference between the first BS and the second BS, wherein the SS burst transmission pattern indicates at least the first SS transmission period. The method further includes wherein the first signal indicates a SS measurement for the first SS burst. The method further includes wherein the first SS burst includes one or more SSs, wherein the method further comprises transmitting, by the first BS to the UE, a second signal requesting the SS measurement for at least one particular SS of the one or more SSs, and wherein the first signal further indicates the SS measurement for the at least one particular SS of the one or more SSs. The method further includes wherein a neighboring cell of the first BS is served by the second BS, wherein the method further comprises transmitting, by the first BS to the UE, a second signal requesting a SS measurement of the neighboring cell, and wherein the first signal indicates a SS measurement of a SS burst transmitted by the second BS in the second SS transmission period. The method further includes wherein the first SS burst includes one or more SSs, wherein a subset of the plurality of SS transmission periods are designated to the first BS, and wherein the method further comprises transmitting, by the first BS to the UE, a second signal requesting the UE to identify a radio link failure between the UE and the first BS based on at least a monitoring of one or more particular SSs during the subset of the plurality of SS transmission periods. The method further includes wherein the transmitting the first SS burst includes transmitting the first SS burst in a first spatial direction, and wherein the second SS transmission period is designated for a SS burst transmission by the second BS in a second spatial direction different than the first spatial direction. The method further includes wherein the transmitting the first SS burst includes transmitting the first SS burst in a first frequency band, and wherein the second SS transmission period is designated for a SS burst transmission by the second BS in a second frequency band different than the first frequency band.

Embodiments of the present disclosure include a method of wireless communication, comprising receiving, by a user equipment (UE) from a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and transmitting, by the UE to the first BS, a first signal based on at least a synchronization to the first SS burst.

The method further includes wherein the first SS burst at least one of a primary synchronization signal (PSS), a secondary synchronization signal (SSS), an extended synchronization signal (ESS), a third synchronization signal (TSS), or a physical broadcast channel (PBCH) signal. The method further includes receiving, by the UE from the first BS, a second SS burst in a third SS transmission period of the plurality of SS transmission periods, wherein the third SS transmission period is adjacent to the first SS transmission period. The method further includes receiving, by the UE from the first BS, a second SS burst in a third SS transmission period of the plurality of SS transmission periods based on a predetermine periodicity. The method further includes determining, by the UE, a SS measurement of the first SS burst, wherein the first signal indicates the SS measurement for the first SS burst. The method further includes wherein the first SS burst includes one or more SSs, wherein the method further comprises receiving, by the UE from the first BS, a second signal requesting the SS measurement for at least one particular SS of the one or more SSs in the first SS burst, and wherein the determining includes determining the SS measurement for the at least one particular SS of the one or more SSs. The method further includes wherein a neighboring cell of the first BS is served by the second BS, and wherein the method further comprises receiving, by the UE from the first BS, a second signal requesting a SS measurement of the neighboring cell; receiving, by the UE from the second BS during the second SS transmission period, a second SS burst; and determining, by the UE, a SS measurement of the second SS burst, wherein the first signal indicates the SS measurement of the second SS burst. The method further includes wherein the first SS burst includes one or more SSs, wherein a subset of the plurality of SS transmission periods are designated to the first BS, and wherein the method further comprises receiving, by the UE from the first BS, a second signal requesting the UE to determine a radio link failure between the UE and the first BS based on at least a monitoring of one or more particular SSs during the subset of the plurality of SS transmission periods; and monitoring, by the UE during SS transmission periods of the plurality of SS transmission periods, for the one or more particular SSs. The method further includes identifying, by the UE, the radio link failure based on the monitoring. The method further includes wherein the receiving includes receiving, by the UE from the first BS, the first SS burst in a first spatial direction, and wherein the second SS transmission period is designated for a SS burst transmission by the second BS in a second spatial direction different than the first spatial direction. The method further includes wherein the receiving includes receiving, by the UE from the first BS, the first SS burst in a first frequency band, and wherein the second SS transmission period is designated for a SS burst transmission by the second BS in a second frequency band different than the first frequency band.

Embodiments of the present disclosure include an apparatus comprising a transmitter configured to transmit a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and a receiver configured to receive, from a user equipment (UE), a first signal in synchronization with the first SS burst.

The apparatus further includes wherein the first SS burst includes at least one of a primary synchronization signal (PSS), a secondary synchronization signal (SSS), an extended synchronization signal (ESS), a third synchronization signal (TSS), or a physical broadcast channel (PBCH) signal. The apparatus further includes wherein the transmitter is further configured to transmit, a second SS burst in a third SS transmission period of the plurality of SS transmission periods, wherein the third SS transmission period is adjacent to the first SS transmission period. The apparatus further includes wherein the transmitter is further configured to transmit a second SS burst in a third SS transmission period of the plurality of SS transmission periods based on a predetermine periodicity. The apparatus further includes a processor configured to obtain a SS burst transmission pattern designated to the first BS based on an interference between the first BS and the second BS, wherein the SS burst transmission pattern indicates at least the first SS transmission period. The apparatus further includes wherein the first signal indicates a SS measurement for the first SS burst. The apparatus further includes wherein the first SS burst includes one or more SSs, wherein the transmitter is further configured to transmit, to the UE, a second signal requesting the SS measurement for at least one particular SS of the one or more SSs, and wherein the first signal further indicates the SS measurement for the at least one particular SS of the one or more SSs. The apparatus further includes wherein a neighboring cell of the first BS is served by the second BS, wherein the transmitter is further configured to transmit, to the UE, a second signal requesting a SS measurement of the neighboring cell, and wherein the first signal indicates a SS measurement of a SS burst transmitted by the second BS in the second SS transmission period. The apparatus further includes wherein the first SS burst includes one or more SSs, wherein a subset of the plurality of SS transmission periods are designated to the first BS, and wherein the transmitter is further configured to transmit, to the UE, a second signal requesting the UE to identify a radio link failure between the UE and the first BS based on at least a monitoring of one or more particular SSs during the subset of the plurality of SS transmission periods. The apparatus further includes wherein the transmitter is further configured to transmit the first SS burst by transmitting the first SS burst in a first spatial direction, and wherein the second SS transmission period is designated for a SS burst transmission by the second BS in a second spatial direction different than the first spatial direction. The apparatus further includes wherein the transmitter is further configured to transmit the first SS burst by transmitting the first SS burst in a first frequency band, and wherein the second SS transmission period is designated for a SS burst transmission by the second BS in a second frequency band different than the first frequency band.

Embodiments of the present disclosure include an apparatus comprising a receiver configured to receive, from a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and a transmitter configured to transmit, to the first BS, a first signal based on at least a synchronization to the first SS burst.

The apparatus further includes wherein the first SS burst at least one of a primary synchronization signal (PSS), a secondary synchronization signal (SSS), an extended synchronization signal (ESS), a third synchronization signal (TSS), or a physical broadcast channel (PBCH) signal. The apparatus further includes wherein the receiver is further configured to receive, from the first BS, a second SS burst in a third SS transmission period of the plurality of SS transmission periods, wherein the third SS transmission period is adjacent to the first SS transmission period. The apparatus further includes wherein the receiver is further configured to receive, from the first BS, a second SS burst in a third SS transmission period of the plurality of SS transmission periods based on a predetermine periodicity. The apparatus further includes comprising a processor configured to determine a SS measurement of the first SS burst, wherein the first signal indicates the SS measurement for the first SS burst. The apparatus further includes wherein the first SS burst includes one or more SSs, wherein the receiver is further configured to receive, from the first BS, a second signal requesting the SS measurement for at least one particular SS of the one or more SSs in the first SS burst, and wherein the determining includes determining the SS measurement for the at least one particular SS of the one or more SSs. The apparatus further includes wherein a neighboring cell of the first BS is served by the second BS, and wherein the receiver is further configured to receive, from the first BS, a second signal requesting a SS measurement of the neighboring cell; and receive, from the second BS during the second SS transmission period, a second SS burst, and wherein the apparatus further comprises a processor configured to determine a SS measurement of the second SS burst, and wherein the first signal indicates the SS measurement of the second SS burst. The apparatus further includes wherein the first SS burst includes one or more SSs, wherein a subset of the plurality of SS transmission periods are designated to the first BS, and wherein the receiver is further configured to receive, from the first BS, a second signal requesting the apparatus to determine a radio link failure between the apparatus and the first BS based on at least a monitoring of one or more particular SSs during the subset of the plurality of SS transmission periods, and wherein the apparatus further comprises a processor configured to monitor, during SS transmission periods of the plurality of SS transmission periods, for the one or more particular SSs. The apparatus further includes wherein the processor is further configured to identify the radio link failure based on the monitoring. The apparatus further includes wherein the receiver is further configured to receive the first SS burst by receiving, from the first BS, the first SS burst in a first spatial direction, and wherein the second SS transmission period is designated for a SS burst transmission by the second BS in a second spatial direction different than the first spatial direction. The apparatus further includes wherein the receiver is further configured to receive the first SS burst by receiving, from the first BS, the first SS burst in a first frequency band, and wherein the second SS transmission period is designated for a SS burst transmission by the second BS in a second frequency band different than the first frequency band.

Embodiments of the present disclosure include a computer-readable medium having program code recorded thereon, the program code comprising code for causing a first base station (BS) to transmit a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and code for causing the first BS to receive, from a user equipment (UE), a first signal in synchronization with the first SS burst.

The computer-readable medium further includes wherein the first SS burst includes at least one of a primary synchronization signal (PSS), a secondary synchronization signal (SSS), an extended synchronization signal (ESS), a third synchronization signal (TSS), or a physical broadcast channel (PBCH) signal. The computer-readable medium further includes code for causing the first BS to transmit a second SS burst in a third SS transmission period of the plurality of SS transmission periods, wherein the third SS transmission period is adjacent to the first SS transmission period. The computer-readable medium further includes code for causing the first BS to transmit a second SS burst in a third SS transmission period of the plurality of SS transmission periods based on a predetermine periodicity. The computer-readable medium further includes code for causing the first BS to obtain a SS burst transmission pattern designated to the first BS based on an interference between the first BS and the second BS, wherein the SS burst transmission pattern indicates at least the first SS transmission period. The computer-readable medium further includes wherein the first signal indicates a SS measurement for the first SS burst. The computer-readable medium further includes wherein the first SS burst includes one or more SSs, wherein the computer-readable medium further comprises code for causing the first BS to transmit, to the UE, a second signal requesting the SS measurement for at least one particular SS of the one or more SSs, and wherein the first signal further indicates the SS measurement for the at least one particular SS of the one or more SSs. The computer-readable medium further includes wherein a neighboring cell of the first BS is served by the second BS, wherein the computer-readable medium further comprises code for causing the first BS to transmit, to the UE, a second signal requesting a SS measurement of the neighboring cell, and wherein the first signal indicates a SS measurement of a SS burst transmitted by the second BS in the second SS transmission period. The computer-readable medium further includes wherein the first SS burst includes one or more SSs, wherein a subset of the plurality of SS transmission periods are designated to the first BS, and wherein the computer-readable medium further comprises code for causing the first BS to transmit, to the UE, a second signal requesting the UE to identify a radio link failure between the UE and the first BS based on at least a monitoring of one or more particular SSs during the subset of the plurality of SS transmission periods. The computer-readable medium further includes wherein the code for transmitting the first SS burst is further configured to transmit the first SS burst in a first spatial direction, and wherein the second SS transmission period is designated for a SS burst transmission by the second BS in a second spatial direction different than the first spatial direction. The computer-readable medium further includes wherein the code for transmitting the first SS burst is further configured to transmit the first SS burst in a first frequency band, and wherein the second SS transmission period is designated for a SS burst transmission by the second BS in a second frequency band different than the first frequency band.

Embodiments of the present disclosure include a computer-readable medium having program code recorded thereon, the program code comprising code for causing a user equipment (UE) to receive, from a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and code for causing the UE to transmit, to the first BS, a first signal based on at least a synchronization to the first SS burst.

The computer-readable medium further includes wherein the first SS burst at least one of a primary synchronization signal (PSS), a secondary synchronization signal (SSS), an extended synchronization signal (ESS), a third synchronization signal (TSS), or a physical broadcast channel (PBCH) signal. The computer-readable medium further includes code for causing the UE to receive, from the first BS, a second SS burst in a third SS transmission period of the plurality of SS transmission periods, wherein the third SS transmission period is adjacent to the first SS transmission period. The computer-readable medium further includes code for causing the UE to receive, from the first BS, a second SS burst in a third SS transmission period of the plurality of SS transmission periods based on a predetermine periodicity. The computer-readable medium further includes code for causing the UE to determine a SS measurement of the first SS burst, wherein the first signal indicates the SS measurement for the first SS burst. The computer-readable medium further includes wherein the first SS burst includes one or more SSs, wherein the computer-readable medium further comprises code for causing the UE to receive, from the first BS, a second signal requesting the SS measurement for at least one particular SS of the one or more SSs in the first SS burst, and wherein the determining includes determining the SS measurement for the at least one particular SS of the one or more SSs. The computer-readable medium further includes wherein a neighboring cell of the first BS is served by the second BS, and wherein the computer-readable medium further comprises code for causing the UE to receive, from the first BS, a second signal requesting a SS measurement of the neighboring cell; code for causing the UE to receive, from the second BS during the second SS transmission period, a second SS burst; and code for causing the UE to determine a SS measurement of the second SS burst, wherein the first signal indicates the SS measurement of the second SS burst. The computer-readable medium further includes wherein the first SS burst includes one or more SSs, wherein a subset of the plurality of SS transmission periods are designated to the first BS, and wherein the computer-readable medium further comprises code for causing the UE to receive, from the first BS, a second signal requesting the UE to determine a radio link failure between the UE and the first BS based on at least a monitoring of one or more particular SSs during the subset of the plurality of SS transmission periods; and code for causing the UE to monitor, during SS transmission periods of the plurality of SS transmission periods, for the one or more particular SSs. The computer-readable medium further includes code for causing the UE to identify the radio link failure based on the monitoring. The computer-readable medium further includes wherein the code for receiving is further configured to receive, from the first BS, the first SS burst in a first spatial direction, and wherein the second SS transmission period is designated for a SS burst transmission by the second BS in a second spatial direction different than the first spatial direction. The computer-readable medium further includes wherein the code for receiving is further configured to receive, from the first BS, the first SS burst in a first frequency band, and wherein the second SS transmission period is designated for a SS burst transmission by the second BS in a second frequency band different than the first frequency band.

Embodiments of the present disclosure include an apparatus comprising means for transmitting a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and means for receiving, from a user equipment (UE), a first signal in synchronization with the first SS burst.

The apparatus further includes wherein the first SS burst includes at least one of a primary synchronization signal (PSS), a secondary synchronization signal (SSS), an extended synchronization signal (ESS), a third synchronization signal (TSS), or a physical broadcast channel (PBCH) signal. The apparatus further includes means for transmitting a second SS burst in a third SS transmission period of the plurality of SS transmission periods, wherein the third SS transmission period is adjacent to the first SS transmission period. The apparatus further includes means for transmitting a second SS burst in a third SS transmission period of the plurality of SS transmission periods based on a predetermine periodicity. The apparatus further includes means for obtaining a SS burst transmission pattern designated to the first BS based on an interference between the first BS and the second BS, wherein the SS burst transmission pattern indicates at least the first SS transmission period. The apparatus further includes wherein the first signal indicates a SS measurement for the first SS burst. The apparatus further includes wherein the first SS burst includes one or more SSs, wherein the apparatus further comprises means for transmitting, to the UE, a second signal requesting the SS measurement for at least one particular SS of the one or more SSs, and wherein the first signal further indicates the SS measurement for the at least one particular SS of the one or more SSs. The apparatus further includes wherein a neighboring cell of the first BS is served by the second BS, wherein the apparatus further comprises means for transmitting, to the UE, a second signal requesting a SS measurement of the neighboring cell, and wherein the first signal indicates a SS measurement of a SS burst transmitted by the second BS in the second SS transmission period. The apparatus further includes wherein the first SS burst includes one or more SSs, wherein a subset of the plurality of SS transmission periods are designated to the first BS, and wherein the apparatus further comprises means for transmitting, to the UE, a second signal requesting the UE to identify a radio link failure between the UE and the first BS based on at least a monitoring of one or more particular SSs during the subset of the plurality of SS transmission periods. The apparatus further includes wherein the means for transmitting the first SS burst is further configured to transmit the first SS burst in a first spatial direction, and wherein the second SS transmission period is designated for a SS burst transmission by the second BS in a second spatial direction different than the first spatial direction. The apparatus further includes wherein the means for transmitting the first SS burst is further configured to transmit the first SS burst in a first frequency band, and wherein the second SS transmission period is designated for a SS burst transmission by the second BS in a second frequency band different than the first frequency band.

Embodiments of the present disclosure include an apparatus comprising means for receiving, from a first base station (BS), a first synchronization signal (SS) burst in a first SS transmission period of a plurality of SS transmission periods, wherein the first SS transmission period is designated to the first BS, wherein a second SS transmission period of the plurality of SS transmission periods is designated to a second BS, and wherein the first SS transmission period and the second SS transmission period are different; and means for transmitting, to the first BS, a first signal based on at least a synchronization to the first SS burst.

The apparatus further includes wherein the first SS burst at least one of a primary synchronization signal (PSS), a secondary synchronization signal (SSS), an extended synchronization signal (ESS), a third synchronization signal (TSS), or a physical broadcast channel (PBCH) signal. The apparatus further includes means for receiving, from the first BS, a second SS burst in a third SS transmission period of the plurality of SS transmission periods, wherein the third SS transmission period is adjacent to the first SS transmission period. The apparatus further includes means for receiving, from the first BS, a second SS burst in a third SS transmission period of the plurality of SS transmission periods based on a predetermine periodicity. The apparatus further includes means for determining a SS measurement of the first SS burst, wherein the first signal indicates the SS measurement for the first SS burst. The apparatus further includes wherein the first SS burst includes one or more SSs, wherein the apparatus further comprises means for receiving, from the first BS, a second signal requesting the SS measurement for at least one particular SS of the one or more SSs in the first SS burst, and wherein the means for determining is further configured to determine the SS measurement for the at least one particular SS of the one or more SSs. The apparatus further includes wherein a neighboring cell of the first BS is served by the second BS, and wherein the apparatus further comprises means for receiving, from the first BS, a second signal requesting a SS measurement of the neighboring cell; means for receiving, from the second BS during the second SS transmission period, a second SS burst; and means for determining a SS measurement of the second SS burst, and wherein the first signal indicates the SS measurement of the second SS burst. The apparatus further includes wherein the first SS burst includes one or more SSs, wherein a subset of the plurality of SS transmission periods are designated to the first BS, and wherein the apparatus further comprises means receiving, from the first BS, a second signal requesting the apparatus to determine a radio link failure between the apparatus and the first BS based on at least a monitoring of one or more particular SSs during the subset of the plurality of SS transmission periods; and means for monitoring, during SS transmission periods of the plurality of SS transmission periods, for the one or more particular SSs. The apparatus further includes means for identifying the radio link failure based on the monitoring. The apparatus further includes wherein means for receiving the first burst is further configured to receive, from the first BS, the first SS burst in a first spatial direction, and wherein the second SS transmission period is designated for a SS burst transmission by the second BS in a second spatial direction different than the first spatial direction. The apparatus further includes wherein means for receiving the first burst is further configured to receive, from the first BS, the first SS burst in a first frequency band, and wherein the second SS transmission period is designated for a SS burst transmission by the second BS in a second frequency band different than the first frequency band.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    transmitting, by a first base station (BS) in a first synchronization signal (SS) transmission period of a plurality of SS transmission periods, a first SS burst including one or more SS blocks, wherein each of the one or more SS blocks includes at least one of a primary synchronization signal (PSS), a secondary synchronization signal (SSS), or a physical broadcast channel (PBCH) signal, wherein the first SS transmission period is designated to the first BS, wherein a second SS transmission period of the plurality of SS transmission periods is designated to a second BS, and wherein the first SS transmission period and the second SS transmission period are different time periods;
    transmitting, by the first BS to a user equipment (UE), a request for a SS measurement, the request indicating a first SS block of the one or more SS blocks in the first SS burst to report for the SS measurement;
    receiving, by the first BS from the UE, a first signal in synchronization with the first SS burst, the first signal indicating the SS measurement for the first SS block of the one or more SS blocks in the first SS burst in response to the request, the first SS block including the at least one of the PSS, the SSS, or the PBCH signal;
    transmitting, by the first BS to the UE, a second signal requesting a SS measurement of a neighboring cell served by the second BS based on interference information; and
    receiving, by the first BS from the UE, a SS measurement of a second SS burst transmitted by the second BS in the second SS transmission period.

2. The method of claim 1, further comprising coordinating, by the first BS with the second BS, to determine the interference information based on an interference between at least the first BS and the second BS.

3. The method of claim 2, further comprising coordinating, by the first BS with the second BS, to determine at least the first SS transmission period and the second SS transmission period based on the interference information.

4. The method of claim 2, further comprising:
    identifying, by the first BS, the first SS block for the SS measurement request based on the interference information.

5. The method of claim 2, further comprising:
    receiving, by the first BS from another UE, a third signal indicating a SS measurement for the first SS burst; and
    filtering, by the first BS, SS measurement information in the SS measurement of the UE and the SS measurement of the another UE based on the interference information.

6. The method of claim 1, further comprising:
    transmitting, by the first BS, one or more SS bursts including one or more SSs during a subset of the plurality of SS transmission periods designated to the first BS, wherein the transmitting the one or more SS bursts includes transmitting the first SS burst in the first SS transmission period; and
    transmitting, by the first BS to the UE, a second signal requesting the UE to identify a radio link failure between the UE and the first BS based on at least a monitoring of one or more particular SSs during the subset of the plurality of SS transmission periods.

7. The method of claim 1, wherein the transmitting the first SS burst includes transmitting the first SS burst in at least one of a first spatial direction or a first frequency band, and wherein the second SS transmission period is designated for a SS burst transmission by the second BS in at least one of a second, different spatial direction or a second, different frequency band.

8. A method of wireless communication, comprising:
    receiving, by a user equipment (UE) from a first base station (BS) in a first synchronization signal (SS) transmission period of a plurality of SS transmission periods, a first SS burst including one or more SS blocks, wherein each of the one or more SS blocks includes at least one of a primary synchronization signal (PSS), a secondary synchronization signal (SSS), or a physical broadcast channel (PBCH) signal, wherein the first SS transmission period is designated to the first BS, wherein a second SS transmission period of the plurality of SS transmission periods is designated to a second BS, and wherein the first SS transmission period and the second SS transmission period are different time periods;
    receiving, by the UE from the first BS, a request for a SS measurement, the request indicating a first SS block of the one or more SS blocks in the first SS burst to report for the SS measurement;
    transmitting, by the UE to the first BS, a first signal based on at least a synchronization to the first SS burst, the first signal indicating the SS measurement for the first SS block of the one or more SS blocks in the first SS burst in response to the request, the first SS block including the at least one of a PSS, a SSS, or a PBCH signal;

receiving, by the UE from the first BS, a second signal requesting a SS measurement of a neighboring cell served by the second BS;

receiving, by the UE from the second BS during the second SS transmission period, a second SS burst;

determining, by the UE, a SS measurement of the second SS burst; and transmitting, by the UE, a third signal indicating the SS measurement of the second SS burst.

9. The method of claim 8, further comprising receiving, by the UE from the first BS, a third SS burst in a third SS transmission period of the plurality of SS transmission periods, wherein the third SS transmission period is adjacent to the first SS transmission period.

10. The method of claim 8, further comprising:
determining, by the UE in response to the request, the SS measurement for the first SS block including the at least one of a PSS, a SSS, or a PBCH signal.

11. The method of claim 8, wherein a subset of the plurality of SS transmission periods are designated to the first BS, and wherein the method further comprises:
receiving, by the UE from the first BS, one or more SS bursts including one or more SSs during a subset of the plurality of SS transmission periods designated to the first BS, wherein the receiving the one or more SS bursts includes receiving the first SS burst in the first SS transmission period; and
receiving, by the UE from the first BS, a second signal requesting the UE to identify a radio link failure between the UE and the first BS based on at least a monitoring of one or more particular SSs during the subset of the plurality of SS transmission periods; and
monitoring, by the UE during SS transmission periods of the plurality of SS transmission periods, for the one or more particular SSs.

12. The method of claim 11, further comprising identifying, by the UE, the radio link failure based on the monitoring.

13. The method of claim 8, wherein the receiving includes receiving, by the UE from the first BS, the first SS burst in at least one of a first spatial direction or a first frequency band, and wherein the second SS transmission period is designated for a SS burst transmission by the second BS in at least one of a second, different spatial direction or a second, different frequency band.

14. An apparatus comprising:
a transmitter configured to:
transmit, in a first synchronization signal (SS) transmission period of a plurality of SS transmission periods, a first SS burst including one or more SS blocks, wherein each of the one or more SS blocks includes at least one of a primary synchronization signal (PSS), a secondary synchronization signal (SSS), or a physical broadcast channel (PBCH) signal, wherein the first SS transmission period is designated to the apparatus, wherein a second SS transmission period of the plurality of SS transmission periods is designated to a second BS, and wherein the first SS transmission period and the second SS transmission period are different time periods;
transmit, to a user equipment (UE), a request for a SS measurement, the request indicating a first SS block of the one or more SS blocks in the first SS burst to report for the SS measurement a first SS block of the one or more SS blocks in the first SS burst; and
transmit, to the UE, a second signal requesting a SS measurement of a neighboring cell served by the second BS based on interference information; and
a receiver configured to;
receive, from the UE, a first signal in synchronization with the first SS burst, the first signal indicating the SS measurement for the first SS block of the one or more SS blocks in the first SS burst in response to the request, the first SS block including the at least one of a PSS, a SSS, or a PBCH signal; and
receive, from the UE, a SS measurement of a second SS burst transmitted by the second BS in the second SS transmission period.

15. The apparatus of claim 14, further comprising a processor configured to coordinate, with the second BS, to determine the interference information based on an interference between at least the first BS and the second BS.

16. The apparatus of claim 15, wherein the processor is further configured to coordinate, with the second BS, to determine at least the first SS transmission period and the second SS transmission period based on the interference information.

17. The apparatus of claim 15, wherein the processor is further configured to identify the first SS block for the SS measurement request based on the interference information.

18. The apparatus of claim 15, wherein the receiver is further configured to receive, from another UE, a third signal indicating a SS measurement for the first SS burst, and wherein the processor is further configured to filter SS measurement information in the SS measurement of the UE and the SS measurement of the another UE based on the interference information.

19. The apparatus of claim 14, wherein the transmitter is further configured to:
transmit one or more SS bursts including one or more SSs during a subset of the plurality of SS transmission periods designated to the first BS, wherein the one or more SSs include one or more SSs in the first SS burst, and wherein the subset of the plurality of SS transmission periods include the first SS transmission period; and
transmit, to the UE, a second signal requesting the UE to identify a radio link failure between the UE and the first BS based on at least a monitoring of one or more particular SSs during the subset of the plurality of SS transmission periods.

20. The apparatus of claim 14, wherein the transmitter is further configured to transmit the first SS burst by transmitting the first SS burst in at least one of a first spatial direction or a first frequency band, and wherein the second SS transmission period is designated for a SS burst transmission by the second BS in at least one of a second, different spatial direction or a second, different frequency band.

21. An apparatus comprising:
a receiver configured to:
receive, from a first base station (BS) in a first synchronization signal (SS) transmission period of a plurality of SS transmission periods, a first SS burst including one or more SS blocks, wherein each of the one or more SS blocks includes at least one of a primary synchronization signal (PSS), a secondary synchronization signal (SSS), or a physical broadcast channel (PBCH) signal, wherein the first SS transmission period is designated to the first BS, wherein a second SS transmission period of the plurality of SS transmission periods is designated to a second BS, and wherein the first SS transmission period and the second SS transmission period are different time periods;

receive, from the first BS, a request for a SS measurement, the request indicating a first SS block of the one or more SS blocks in the first SS burst to report for the SS measurement;

receive, from the first BS, a second signal requesting a SS measurement of a neighboring cell of the first BS served by the second BS; and receive, from the second BS during the second SS transmission period, a second SS burst;

a processor configured to determine a SS measurement of the second SS burst; and a transmitter configured to:
    transmit, to the first BS, a first signal based on at least a synchronization to the first SS burst, the first signal indicating the SS measurement for the first SS block of the one or more SS blocks in the first SS burst in response to the request, the first SS block including the at least one of a PSS, a SSS, or a PBCH signal; and
    transmit, to the second BS, a third signal indicating the SS measurement of the second SS burst.

22. The apparatus of claim 21, wherein the receiver is further configured to receive, from the first BS, a third SS burst in a third SS transmission period of the plurality of SS transmission periods, and wherein the third SS transmission period is adjacent to the first SS transmission period.

23. The apparatus of claim 21, further comprising a processor configured to determine, in response to the request, the SS measurement for the first SS block including the at least one of a PSS, a SSS, or a PBCH signal.

24. The apparatus of claim 21, wherein the receiver is further configured to:
    receive, from the first BS, one or more SS bursts including one or more SSs during a subset of the plurality of SS transmission periods designated to the first BS, wherein the one or more SS bursts include the first SS burst; and
    receive, from the first BS, a second signal requesting the apparatus to determine a radio link failure between the apparatus and the first BS based on at least a monitoring of one or more particular SSs during the subset of the plurality of SS transmission periods, and
    wherein the apparatus further comprises a processor configured to monitor, during SS transmission periods of the plurality of SS transmission periods, for the one or more particular SSs.

25. The apparatus of claim 21, wherein the receiver is further configured to receive the first SS burst by receiving, from the first BS, the first SS burst in at least one of a first spatial direction or a first frequency band, and wherein the second SS transmission period is designated for a SS burst transmission by the second BS in at least one of a second, different spatial direction or a second, different frequency band.

* * * * *